United States Patent
Yoshida et al.

(10) Patent No.: US 11,698,548 B2
(45) Date of Patent: Jul. 11, 2023

(54) LIQUID CRYSTAL DISPLAY APPARATUS COMPRISING A LIGHT SCATTERING FILM HAVING A FUNCTIONAL LAYER CONTAINING LIGHT SCATTERING PARTICLES

(71) Applicant: SAKAI DISPLAY PRODUCTS CORPORATION, Sakai (JP)

(72) Inventors: Yukio Yoshida, Sakai (JP); Atsuko Maeda, Sakai (JP); Nobuaki Ikenaka, Sakai (JP); Katsumi Kondo, Sakai (JP); Toshihiro Yamashita, Sakai (JP); Hideki Nakagawa, Sakai (JP); Sumire Hombo, Sakai (JP); Mitsuhiro Takeba, Sakai (JP); Shintaro Yamada, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 108 days.

(21) Appl. No.: 17/599,489

(22) PCT Filed: Mar. 27, 2020

(86) PCT No.: PCT/JP2020/014378
§ 371 (c)(1),
(2) Date: Feb. 11, 2022

(87) PCT Pub. No.: WO2020/196897
PCT Pub. Date: Oct. 1, 2020

(65) Prior Publication Data
US 2022/0197083 A1    Jun. 23, 2022

(51) Int. Cl.
*G02F 1/1335* (2006.01)
*G02B 5/30* (2006.01)

(52) U.S. Cl.
CPC ....... *G02F 1/133504* (2013.01); *G02B 5/305* (2013.01); *G02F 1/133531* (2021.01)

(58) Field of Classification Search
CPC . G02B 5/021; G02B 5/0257; G02F 1/133507; G02F 2203/03
See application file for complete search history.

(56) References Cited

U.S. PATENT DOCUMENTS

2006/0290253 A1*  12/2006  Yeo ..................... G02B 5/0231
                                                 313/116
2010/0245715 A1*  9/2010  Watanabe ............... G02B 5/02
                                                 359/488.01
(Continued)

FOREIGN PATENT DOCUMENTS

JP    H05-281538 A    10/1993
JP    2006-208647 A    8/2006
(Continued)

*Primary Examiner* — Paul C Lee
(74) *Attorney, Agent, or Firm* — ScienBiziP, P.C.

(57) ABSTRACT

A liquid crystal display apparatus, includes: a light-condensing backlight unit; a liquid crystal panel including a first linear polarizer and a second linear polarizer; a light scattering film facing the second linear polarizer; and a third linear polarizer facing the light scattering film. The light scattering film includes a functional layer including an organic polymer compound and light scattering particles. The functional layer includes a particle layer in which a fraction of 60% by volume to 100% by volume of the light scattering particles included in the functional layer expands along a surface of the particle layer at which the light output from the liquid crystal panel is received, and the particle layer is concentrated to a region having a thickness of 1 to 80% of a total thickness of the functional layer, in a direction perpendicular to the contact surface.

14 Claims, 3 Drawing Sheets

(56) References Cited

U.S. PATENT DOCUMENTS

| | | | | |
|---|---|---|---|---|
| 2012/0033155 A1* | 2/2012 | Asano | ............... | G02B 5/3033 |
| | | | | 359/493.01 |
| 2012/0081635 A1* | 4/2012 | Fukuda | ............... | G02B 1/14 |
| | | | | 264/1.6 |
| 2014/0254021 A1 | 9/2014 | Furui et al. | | |
| 2015/0323711 A1* | 11/2015 | Bessho | ............ | G02F 1/133606 |
| | | | | 349/71 |
| 2018/0341147 A1* | 11/2018 | Sugitani | ............ | G02F 1/133617 |

FOREIGN PATENT DOCUMENTS

| | | | |
|---|---|---|---|
| JP | 2007-071916 A | 3/2007 | |
| JP | 2011-043685 A | 3/2011 | |
| JP | 2011-186008 A | 9/2011 | |
| JP | 5323190 B2 | 10/2013 | |
| JP | 2018-173550 A | 11/2018 | |
| WO | 2006/112325 A1 | 10/2006 | |
| WO | 2013/054805 A1 | 4/2013 | |

* cited by examiner

LIQUID CRYSTAL DISPLAY APPARATUS COMPRISING A LIGHT SCATTERING FILM HAVING A FUNCTIONAL LAYER CONTAINING LIGHT SCATTERING PARTICLES

TECHNICAL FIELD

The present disclosure relates to a liquid crystal display apparatus.

BACKGROUND ART

Currently, a VA (Vertical Alignment) system and an IPS (In-Plane Switching) system are widely used as display modes of liquid crystal display apparatuses. Unlike a liquid crystal display apparatus of the IPS system, a liquid crystal display apparatus of the VA system provides a display having a higher contrast ratio in a "normal-direction view" provided when the liquid crystal display apparatus is viewed from a position in a direction normal thereto (provides a higher normal contrast ratio) than in an "oblique-direction view" provided when the liquid crystal display apparatus is viewed from a position shifted from the direction normal thereto. However, the oblique-direction view has a color and a luminance that are significantly different from those of the normal-direction view. As a result, the image quality is declined.

Patent Document No. 1 discloses a liquid crystal display apparatus of the VA system in which a condensing light source is used as a backlight unit and light transmitted through a liquid crystal panel is scattered to increase the viewing angle thereof. With the technology described in Patent Document No. 1, the light from the backlight unit is condensed so as not to expand and then is incident on the liquid crystal panel. The light transmitted through the liquid crystal panel is expanded by a light diffusing layer.

The light diffusing layer is formed of a light-transmissive polymer containing scatterers. The light incident on the light diffusing layer is scattered by the scatterers. The light to be transmitted through the light diffusing layer has already been transmitted through the liquid crystal panel. Therefore, light in an oblique direction is generated in the light diffusing layer without pixels adjacent to each other in the liquid crystal panel being color-mixed with each other. As a result, a wide viewing angle may be provided.

However, such a light diffusing layer causes the following problem: external light incident on the liquid crystal panel from the viewer's side returns back to the viewer's side, and therefore, it is made difficult for a viewer to recognize the display on the screen and thus the normal contrast ratio in a bright site is decreased. In order to decrease the amount of the external light returning to the viewer's side, Patent Document No. 1 proposes incorporating a colorant into the light diffusing layer or providing a colored layer, containing a light-transmissive polymer and a colorant incorporated thereto, together with a light scattering film.

CITATION LIST

Patent Literature

Patent Document No. 1: Japanese Patent No. 5323190

SUMMARY OF INVENTION

Technical Problem

The use of the technology described in Patent Document No. 1 allows the amount of external light returning to the viewer's side at the light scattering film to be decreased. However, the light diffusing layer or the colored layer containing the colorant absorbs the external light and also absorbs the light transmitted through the liquid crystal panel, and therefore, decreases the light transmittance. As a result, there occurs a problem that the normal luminance in the normal direction is decreased.

As can be seen, there is no technology put into practice so far that suppresses the decrease in the normal luminance and also decreases the amount of external light returning to the viewer's side at the light scattering film.

The present disclosure, made in order to solve these problems, has an object of providing a liquid crystal display apparatus that decreases the amount of external light returning to the viewer's side at a light scattering film without decreasing the normal luminance almost at all.

Solution to Problem

A liquid crystal display apparatus according to one embodiment of the present disclosure includes a condensing backlight unit; a liquid crystal panel including a first linear polarizer on which light from the backlight unit is incident and a second linear polarizer from which the light is output; a light scattering film facing the second linear polarizer; and a third linear polarizer facing the light scattering film. The light scattering film includes a functional layer including an organic polymer compound and light scattering particles contained in the organic polymer compound. The third linear polarizer has an axis of polarization extending in the same direction as an axis of polarization of the second linear polarizer.

Advantageous Effects of Invention

According to one embodiment of the present disclosure, a liquid crystal display apparatus suppressing the return of the external light without decreasing the normal luminance of the display screen almost at all while expanding the viewing angle and thus providing high visual recognizability may be provided.

DESCRIPTION OF EMBODIMENTS

A liquid crystal display apparatus according to an embodiment of the present disclosure will be described with reference to the drawings.

Figure 1A:
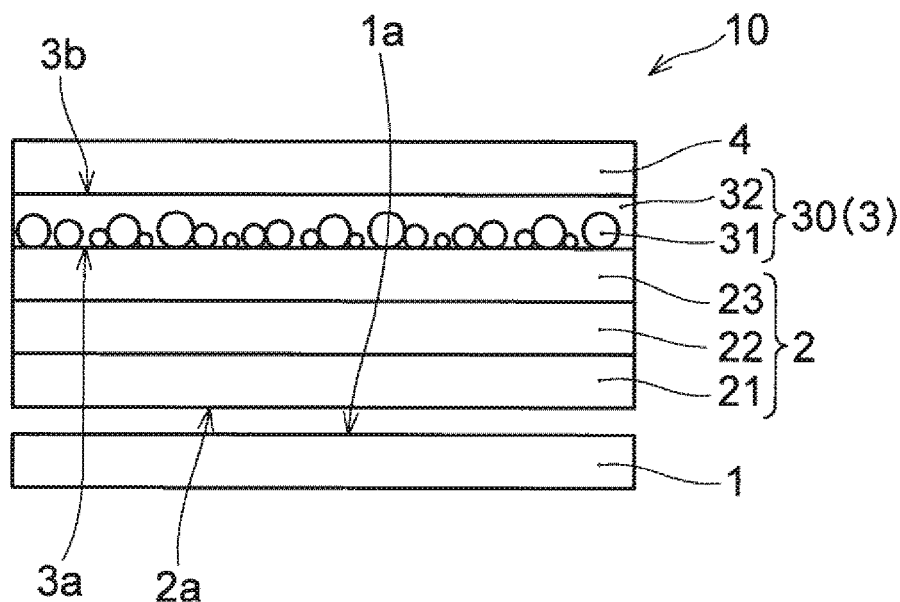
FIG. 1A shows a structure of a liquid crystal display apparatus according to an embodiment of the present disclosure.

FIG. 1A is a cross-sectional view of a liquid crystal display apparatus according to an embodiment of the present disclosure. As shown in FIG. 1A, a liquid crystal display apparatus 10 according to this embodiment includes a backlight unit 1, a liquid crystal panel 2, and a light scattering film 3. These components are located such that light from the backlight unit 1 is transmitted first through the liquid crystal panel 2 and then through the light scattering film 3.

A liquid crystal panel in a liquid crystal display apparatus usually includes two polarizing plates bonded to each other. A front polarizing plane (closer to the viewer) is also referred to as a "front polarizing plate", and a rear polarizing plate (closer to the backlight unit) is also referred to as a "rear polarizing plate". In the liquid crystal display apparatus 10 according to this embodiment, the liquid crystal panel 2 includes a first polarizer 21 acting as the rear polarizing plate and a second polarizer 23 acting as the front polarizing plate. A liquid crystal layer 22 containing a liquid crystal composition is held between the first polarizer 21 and the second polarizer 23.

The liquid crystal panel 2 is located such that a rear surface 2a thereof faces a light output surface 1a of the backlight unit 1 (FIG. 1A) in order to allow the light from the backlight unit to be transmitted through the liquid crystal panel 2. Although simplified in FIG. 1A, the liquid crystal panel 2 has a structure substantially the same as that of a common liquid crystal panel. The liquid crystal layer 22 is held between a pair of transparent substrates (not shown). The first polarizer 21 and the second polarizer 23 are respectively provided on outer surfaces of the pair of transparent substrates. Electrodes (not shown) are respectively formed on the pair of transparent substrates. A director of the liquid crystal composition contained in the liquid crystal layer 22 is controlled by TFTs formed on one of the transparent substrates.

The backlight unit 1 outputs white light toward the first polarizer 21, and the light transmitted through the first polarizer 21 is incident on the liquid crystal layer 22 and then is transmitted through the second polarizer 23. The liquid crystal layer 22 changes the director of the liquid crystal composition to control the transmittance for the white light from the backlight unit 1.

The director of the liquid crystal composition contained in the liquid crystal layer 22 is controlled to be generally perpendicular with respect to a display surface of the liquid crystal panel 2 in the absence of a voltage, and to be significantly inclined with respect to the display surface of the liquid crystal panel 2 in the presence of a voltage (normally black).

In this embodiment, the expression that "the director of the liquid crystal composition is generally perpendicular" encompasses a case where the director of the liquid crystal composition is oriented at a certain inclination angle (pretilt angle) with respect to a direction vertical to the substrates. The director of the liquid crystal composition may be oriented at a pretilt angle of 0.5° or larger and 5° or smaller with respect to the direction vertical to the substrates in the absence of a voltage.

Figure 3:
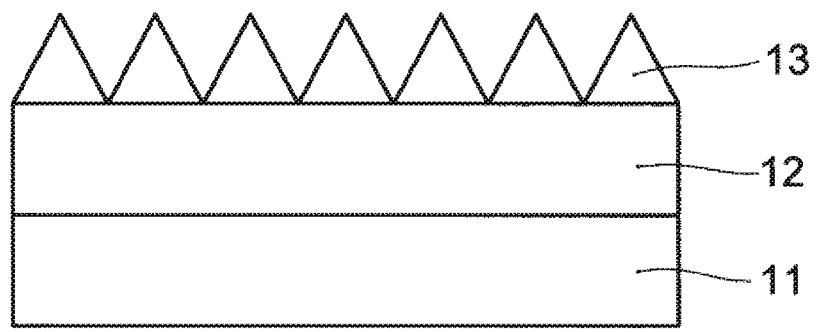
FIG. 3 shows a structure of a backlight unit according to an embodiment of the present disclosure.

The backlight unit 1 is located so as to face the first polarizer 21 of the liquid crystal panel 2, and includes the light output surface 1a, from which white light is output toward the first polarizer 21. As shown in, for example, FIG. 3, the backlight unit 1 includes a light emitting portion 11 such as an LED, a cathode ray tube or the like, a diffusing plate 12 homogenizing light from the light emitting portion 11, and prisms 13 condensing light. In the case where the light emitting portion 11 includes a plurality of LEDs, a portion of the backlight unit 1 including an LED and a portion of the backlight unit 1 including no LED are different from each other in the luminance. In order to eliminate such a difference, the diffusing plate 12 is provided in the backlight unit 1. Light that is output from the diffusing plate 12 proceeds in an expanding path. A backlight unit having a polar angle larger than 32° at a surface of a diffusing plate is a non-condensing light source. Therefore, the prisms 13 are located on a surface of the diffusing plate 12, so that the backlight unit 1 acts as a condensing light source. Namely, the liquid crystal display apparatus according to the present disclosure uses a light-condensing backlight unit.

The backlight unit 1 is a planar light source outputting white light in a planar state. It is preferred that the backlight unit 1 is a condensing light source, by which light exhibiting a normalized luminance of 0.5 or higher (normalized luminance with the maximum luminance being 1) is detected only in a polar angle (θ) range of −32° to +32° in a luminance distribution of light that is output in a direction having an azimuth φ of 0° or 180°. As can be seen, it is preferred that the backlight unit 1 condenses white light such that an optical axis thereof becomes closer to the normal to the output surface of the light source. The backlight unit 1 is structured such that among light incident on the liquid crystal panel 2 from the backlight unit 1, light having a normalized luminance of 0.5 or higher is incident at an angle of incidence that is preferably 32° or smaller, and more preferably 12.5° or smaller. However, the backlight unit 1 is not limited to having such a structure.

A light source by which light exhibiting a normalized luminance of 0.5 or higher is detected only in a polar angle (θ) range of −32° to +32° as described above outputs almost no light that crosses the liquid crystal composition obliquely. Such a light source is referred to as a "condensing light source". A light source by which light exhibiting a normalized luminance of 0.5 or higher is detected as light having a polar angle smaller than −32° or larger than +32° is referred to as a "non-condensing light source".

Components usable for condensing light include a prism sheet, a light guide plate, a microlens sheet, a louver film and the like, but are not limited to these.

The white light may be provided by a white LED, may be provided by causing light from a blue LED to be transmitted through a fluorescent layer, or may be provided by a combination of LEDs of the three primary colors, i.e., red, green and blue LEDs.

In this specification, the term "polar angle" is intended to refer to the following. A front-rear direction of the liquid crystal display apparatus as seen from the viewer (z direction perpendicular to an xy plane defined by a left-right direction (z direction) of the liquid crystal panel and an up-down direction (y direction) of the liquid crystal panel) is used as the reference. The "polar angle" is intended to refer to an angle θ at which a vector exhibiting a state of the "oblique-direction view" is inclined toward the xy plane with respect to the reference. Namely, the direction normal to the liquid crystal panel has a polar angle of 0°.

The term "azimuth" is intended to refer to an angle φ by which an image of the vector projected on the zy plane is rotated from a positive direction of the x axis. The positive direction of the x axis has an azimuth of 0°. In the case of being referred to regarding the light source, the "azimuth" is intended to refer to a direction of the output surface of the light source provided in the liquid crystal display apparatus so as to be parallel to the liquid crystal panel.

Figure 4A:
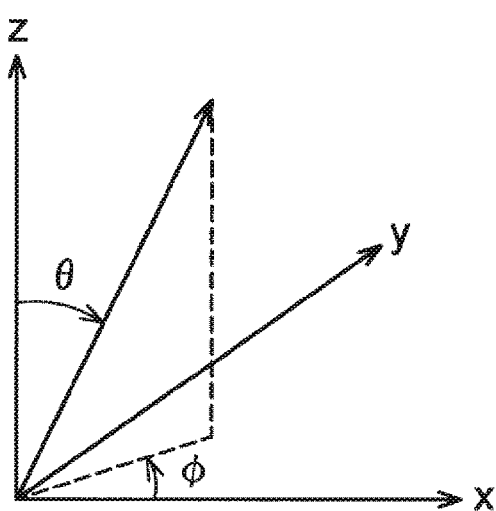
FIG. 4A shows definitions of angles (polar angle and azimuth) according to an embodiment of the present disclosure.
Figure 4B:
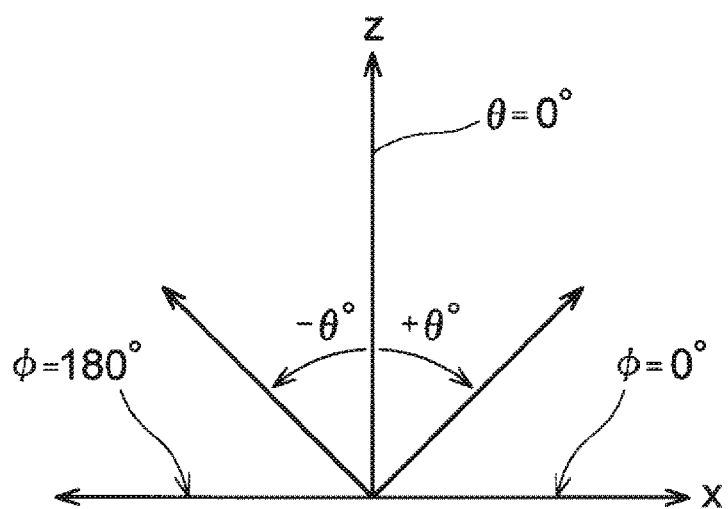
FIG. 4B shows a definition of an angle (polar angle) according to an embodiment of the present disclosure.

The polar angle and the azimuth intended in this specification are shown in FIG. 4A and FIG. 4B. Herein, the polar angle (θ)=0° is used as the reference. A polar angle in the φ° direction is defined as a +(positive)θ, and a polar angle in the φ+180° direction is defined as a −(negative)θ.

The light from the backlight unit 1 is converted into linearly polarized light by the first polarizer 21, the direction of the linearly polarized light is controlled by the liquid crystal layer 22, and the second polarizer 23 controls whether or not the light is to be transmitted through the second polarizer 23. In this manner, a desired display is realized. The liquid crystal layer 22 may be controlled by a TN system, a VA system, an IPS system or the like. Any system is usable. The effect of the present disclosure is especially large in the case where the VA system is used.

A liquid crystal display apparatus of the VA system has advantages of providing a high contrast ratio, a high response speed and an image with less extra coloring, and uses a liquid crystal composition having a negative dielectric anisotropy. Such a liquid crystal composition may be a mixture of a compound having a negative dielectric anisotropy and a compound having a neutral dielectric anisotropy.

An example of compound having a negative dielectric anisotropy may contain a functional group in which an atom having a large electronegativity such as an F atom or the like is provided as a substituent in a shorter axis direction of the molecule at a center of a molecular framework as shown below.

[Chemical formula 1]

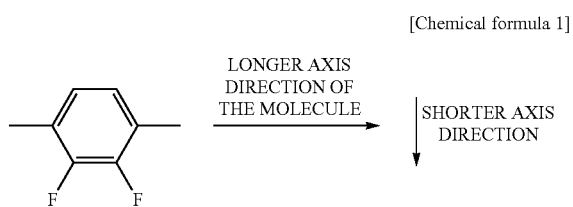

A compound having a neutral dielectric anisotropy is preferably usable in order to decrease the viscosity or to increase the liquid crystallinity at low temperature. An example of such a compound has the following structural formula.

[Chemical formula 2]

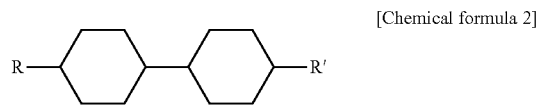

In the formula, R and R' are each —$C_nH_{2n+1}$ (alkyl group) or —O—$C_nH_{2n+1}$ (alkoxy group).

The compound shown above is merely an example of compound having a negative dielectric anisotropy. The compound usable for the liquid crystal composition according to the present disclosure is not limited to this.

The light scattering film 3 includes a light receiving surface 3a facing the second polarizer 23 and a light output surface 3b opposite to the light receiving surface 3a. The light scattering film 3 converts the light received at the light receiving surface 3a into scattering light therein, and then outputs the scattering light outside from the light output surface 3b (toward the viewer present to the front of the liquid crystal display apparatus 10).

Figure 2A:
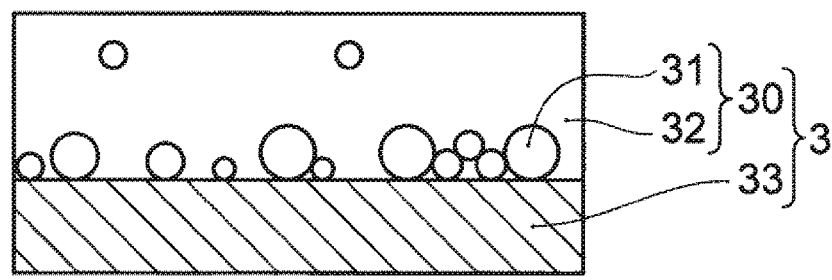
FIG. 2A shows a light scattering film according to an embodiment of the present disclosure.
Figure 2B:
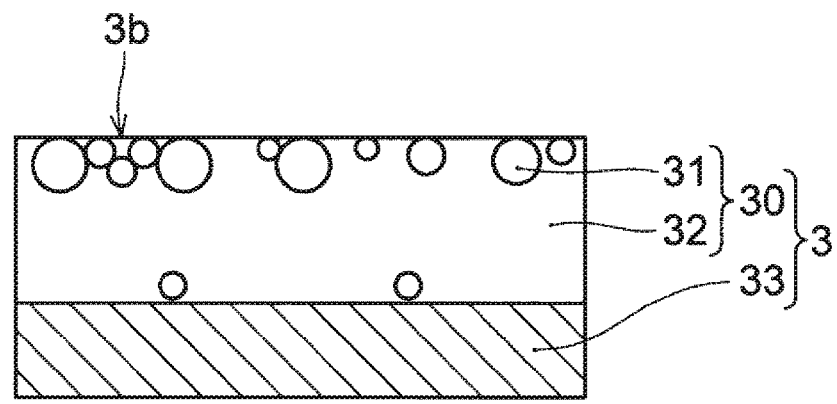
FIG. 2B shows a light scattering film according to an embodiment of the present disclosure.

As shown in, for example, FIG. 2A and FIG. 2B, the light scattering film 3 includes a functional layer 30, which is formed of a light-transmissive compound including light scattering particles 31 and an organic polymer compound 32 as a medium. The functional layer 30 includes a light receiving surface receiving the light that is output from the liquid crystal panel 2 and a light output surface, from which isotropic scattering light generated in the functional layer is released outside. These surfaces respectively correspond to the light receiving surface 3a and the light output surface 3b of the light scattering film 3 in the case where the light scattering film 3 includes no substrate.

In the functional layer 30, the light scattering particles 31 may be dispersed homogeneously in the organic polymer compound 32 or may be concentrated at a specific position, as long as the light is scattered isotropically. It is preferred that the functional layer 30 includes a particle layer expanding along the light receiving surface in order to avoid a return of external light (optical feedback). The particle layer is concentrated in a region, of the functional layer 30, having a thickness that is 1 to 80%, preferably 10 to 80%, more preferably 30 to 80%, and still more preferably 50 to 30% of a total thickness of the functional layer 30.

Figure 1B:
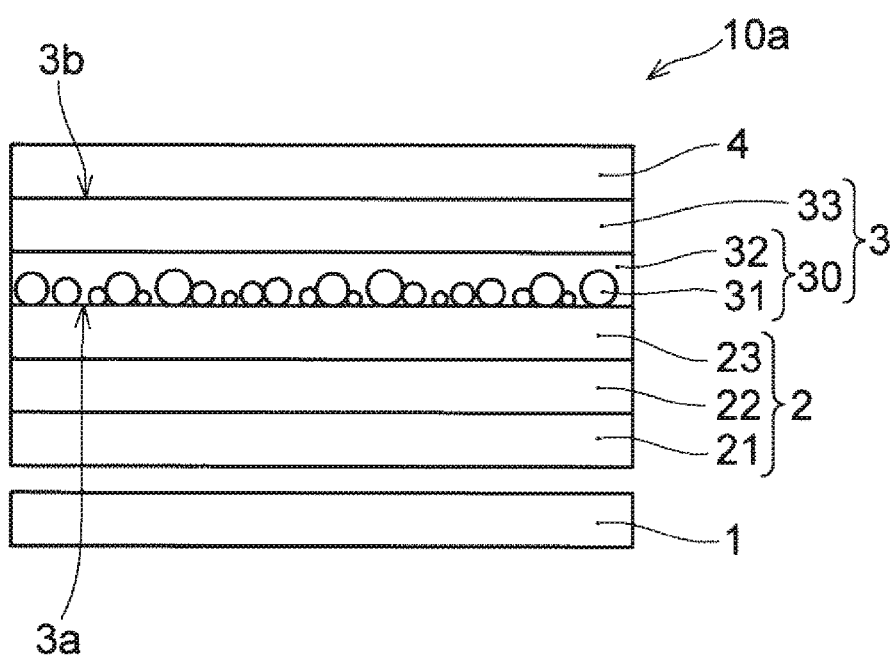
FIG. 1B shows a modification of FIG. 1A.

The light scattering film 3 may include a light-transmissive polymer film 33 as a substrate holding the functional layer 30 (FIG. 2A and FIG. 2B). It is known that in the case where a film including a substrate formed of a resin having birefringence such as polyethylene terephthalate (PET) or the like is located closer to the viewer than a liquid crystal panel, rainbow-like unevenness (interference color) is caused by the birefringence, resulting in a decline in the display quality. The polymer film 33 may possibly cause interference color in an oblique direction when having high birefringence. Therefore, it is preferred that the polymer film 33 has low birefringence. It is preferred that the polymer film 33 is a zero-phase shift film, which causes no phase shift between in the x-axis direction and in the y-axis direction. An example of the polymer film 33 having such properties is a film formed of a triacetylcellulose (TAC)-based resin. The polymer film 33 is not limited to this. As shown in FIG. 1A, only the functional layer 30 may be directly bonded as the light scattering film 3 to the second polarizer 23 of the liquid crystal panel 2. Alternatively, as shown in FIG. 1B, the light scattering film 3 including the functional layer 30 and the polymer film 33 bonded to each other may be bonded to the second polarizer 23. In this case, either the polymer film 33 or the functional layer 30 may be bonded to the second polarizer 23.

As can be seen, in the case where a film having a light scattering function is located closer to the viewer than the liquid crystal panel, the above-described zero-phase shift film is preferably used as the substrate. However, such a film is difficult to handle when being large, and is costly.

According to the present disclosure, the use of a light scattering film including a functional layer having the above-described structure may suppress the rainbow-like unevenness from being caused by birefringence even in the case where the PET or the like is used for the substrate. Specifically, in the case where as shown in FIG. 1B and FIG. 2A, a functional layer according to the present disclosure is located closer to the viewer than the film having high birefringence (e.g., PET substrate), the rainbow-like unevenness caused by the birefringence may be avoided.

As described above, the light scattering film 3 has a function of scattering the incident light therein and outputting isotropic scattering light generated therein to the outside, and includes the functional layer 30 having such a function. The functional layer 30 is formed of a light-transmissive composition including the organic polymer compound 32 and the light scattering particles 31 contained in the organic polymer compound 32. The functional layer 30 is a layer that scatters light isotropically. The light scattering film 3 does not include any layer that scatters light anisotropically (anisotropic light scattering layer).

Materials usable for the light scattering particles 31 may include, for example, alumina (aluminum oxide), hollow silica, aluminum, barium sulfate, silicon oxide, titanium oxide, white lead (basic lead carbonate), zinc oxide, zinc, melamine resin, acrylic resin, polystyrene-based resin, and the like, but are not limited to these.

The organic polymer compound 32 is formed of a material having a refractive index different from that of the light scattering particles 31. Materials usable for the organic polymer compound 32 may include, for example, organic polymer compounds such as polymethylmethacrylate (PMMA), polyvinylalcohol (PVA), polyvinylchloride (PVC), polycarbonate (PC), polyethylene (PE), polystyrene (PS), polyamide (PA), silicone (SI), urea (UF), epoxy (EP), polypropylene (PP), cellulose acetate (CA), polyvinylidene chloride (PVdC), and the like, but are not limited to these.

Regarding the light scattering film 3 according to the present disclosure, the difference between the refractive index of the organic polymer compound 32 and the refractive index of the light scattering particles 31 is preferably 0.15 or larger and 1.0 or smaller, more preferably 0.15 or larger and 0.30 or smaller, and still more preferably 0.20 or larger and 0.30 or smaller. The refractive index of the organic polymer compound 32 may be larger or smaller than the refractive index of the light scattering particles 31, as long as the absolute value of the difference in the refractive index satisfies the above-described range. if the absolute value of the difference in the refractive index is too small, it is difficult to provide a wide viewing angle. If the absolute value of the difference in the refractive index is too large, it is needed to decrease the concentration of the particles or to thin the light scattering film 3.

In the case where, for example, alumina is used for the light scattering particles 31, the organic polymer compound 32 is preferably formed of PMMA, PVA, PVC, PC, PB, PP or CA, and more preferably formed of PMMA, PVA, PVC, PB, PP or CA. In the case where hollow silica is used for the light scattering particles 31, the organic polymer compound 32 is preferably formed of PMMA, PVA, PVC, PC, PB, PP or CA, and more preferably formed of PVA, PVC, PC or PB. In the case where a melamine resin is used for the light scattering particles 31, the organic polymer compound 32 is preferably formed of PMMA, PVA, PP or CA, and more preferably formed of CA.

The light scattering particles 31 have an average particle size that is preferably 1.5 µm or larger and 6.0 µm or smaller, more preferably 1.5 µm or larger and 4.5 µm or smaller, still more preferably 1.5 µm or larger and to 3.5 µm or smaller, and yet more preferably 2.0 µm or larger and 3.0 µm or smaller. The particle size of the light scattering particles 31 has a mode that is preferably 1.75 µm or larger and 3.5 µm or smaller, more preferably 1.75 µm or larger and 3.0 µm or smaller, still more preferably 2.0 µm or larger and 3.0 µm or smaller, and yet more preferably 2.25 µm or larger and 2.75 µm or smaller. The particle layer has a thickness that is preferably 1.0 to 5.0 times the above-described average particle size of the light scattering particles 31, more preferably 1.0 to 4.0 times the average particle size, and still more preferably 1.0 to 3.0 times the average particle size.

In the case where, for example, the average particle size of the light scattering particles included in the light scattering film is about 2.0 µm, the thickness of the particle layer formed in the light scattering film is preferably about 2.0 to about 10.0 µm, more preferably about 2.0 to about 8.0 µm, and still more preferably about 2.0 to about 6.0 µm.

The particle layer may be formed close to the light receiving surface 3a of the light scattering film 3 (FIG. 1A), close to the light output surface 3b of the light scattering film 3 (FIG. 2B), or far from both of the light receiving surface 3a and the light output surface 3b. In order to decrease the optical feedback, it is preferred that the particle layer is not in contact with the light output surface 3b.

Among the light scattering particles included in the particle layer described above, a fraction having the above-described average particle size has a content that is preferably 60% by volume or higher and 96% by volume or lower, more preferably 65% by volume or higher and 96% by volume or lower, and still more preferably 75% by volume or higher and 96% by volume or lower with respect to the entirety of the light scattering particles included in the light scattering film 3. The content of this fraction may even be 80% by volume or higher and 92% by volume or lower with respect to the entirety of the light scattering particles included in the light scattering film 3.

Among the light scattering particles included in the particle layer described above, a fraction having an average particle size of 0.1 µm or larger and 1.5 µm or smaller has a content that is preferably 4% by volume or higher and 40% by volume or lower, more preferably 4% by volume or higher and 35% by volume or lower, and still more preferably 4%[1] by volume or higher and 25% by volume or lower with respect to the entirety of the light scattering particles included in the functional layer 30. The content of this fraction may even be 8% by volume or higher and 20% by volume or lower with respect to the entirety of the light scattering particles included in the functional layer 30.

In one embodiment, the mode of the particle size of the light scattering particles is 1.75 µm or larger and 2.5 µm or smaller. With respect to the particles having the mode, a fraction having a particle size of 1.5 µm or larger and 3.5 µm or smaller has a content of 75% by volume or higher, and a fraction having a particle size of 0.1 µm or larger and smaller than 1.5 µm has a content of 25% by volume or lower.

In the liquid crystal display apparatus 10 according to this embodiment, it is preferred that the light scattering film 3 does not decrease the normal luminance almost at all. It is preferred that the light scattering film 3 decreases the amount of the light returning to the viewer's side (optical feedback) among the external light from the viewer's side. It is especially preferred that the external light scattered by the light scattering particles 31 included in the light scattering film 3, as well as a reflected portion of the external light, is suppressed from returning to the viewer's side. The term "normal luminance" refers to a luminance of the display viewed at a polar angle of 0° with respect to the liquid crystal display apparatus.

In order to avoid the decrease in the normal luminance, it is preferred that light is scattered forward in a large amount and is not scattered much rearward by the light scattering film. It is known that in the case where light scattering particles having a size generally equal to, or larger than, the wavelength of the light (400 nm to 800 nm) are used, the light is scattered forward in a large amount and is not scattered much rearward. This may be easily understood from that in an example of Patent Document No. 1, microparticles having an average particle diameter of about 1 µm are used as the particles that scatter the light forward. However, the structure of the present disclosure would not have been arrived at readily by such knowledge.

The light scattering film is formed by applying a liquid organic polymer compound containing the light scattering particles to a main surface of a substrate and then drying the liquid organic polymer compound. Materials preferably usable for the substrate in the light scattering film according to the present disclosure include TAC, PET, COP and the like, but are not limited to these.

There is no specific limitation on the method for applying the organic polymer compound to the substrate, as long as a film may be formed with high precision at a desired thickness. Usable methods include, for example, gravure coating, reverse coating, knife coating, dip coating, spray coating, air knife coating, spin coating, roll coating, printing, immersion withdrawal, curtain coating, die coating, casting, bar coating, extrusion coating, E-type application, and the like.

The light scattering particles are applied in an amount that is preferably 0.01 to 2.0 mg, more preferably 0.015 to 1.75 mg, and still more preferably 0.03 to 1.0 mg per 1 $cm^2$ of the substrate. The light scattering film has an average thickness that is preferably 4 to 220 μm, more preferably 4 to 50 μm, and still more preferably 4 to 15 μm. If being too thin, the light scattering film does not have a sufficiently high hardness. If being too thick, the light scattering film is difficult to be processed.

Based on such an amount to be applied, the light scattering film 3, after being dried, includes the light scattering particles 31 at a content that is preferably 10 to 50% by volume, and more preferably 10 to 30% by volume. In the case where the content of the light scattering particles 31 with respect to the post-drying light scattering film 3 is too low, a sufficient amount of light is not scattered by the light scattering film 3. In this case, a wide viewing angle is not provided. In the case where the content of the light scattering particles 31 with respect to the post-drying light scattering film 3 is too high, the scattering degree is increased to be unnecessarily high. As a result, the normal luminance is decreased whereas the optical feedback is increased.

In the case where the content of the light scattering particles 31 with respect to the post-drying light scattering film 3 is in the above-described range, or in the case where the light scattering film 3 has an average thickness in the above-described range, the total volume of the light scattering particles 31 included in the particle layer corresponding to 1 $m^2$, of the surface of the post-drying light scattering film 3, that is in contact with the second polarizer 23 is preferably $4.5 \times 10^{-7}$ $m^3$ to $3.6 \times 10^{-6}$ $m^3$, more preferably $6.0 \times 10^{-7}$ $m^3$ to $2.3 \times 10^{-6}$ $m^3$, and still more preferably $7.5 \times 10^{-7}$ $m^3$ to $1.5 \times 10^{-6}$ $m^3$.

When used in this specification, the term "particle" is intended to refer to a particle having a size (or dimension) of 0.1 μm or larger and 20 μm or smaller. The particles may be spherical or non-spherical. In this specification, the term "spherical" is intended to refer to a shape having a ratio smaller than 1.2 between the maximum size and the minimum size in a three-dimensional space of the particle. The term "non-spherical" is intended to refer to a shape having a ratio larger than 1.2 between the maximum size and the minimum size in the three-dimensional space of the particle. In this specification, the term "particle diameter" is used equivalently to the term "particle size". In the case of a spherical particle, the "particle diameter" is intended to refer to the diameter of the particle. In the case of a non-spherical particle, the "particle diameter" is intended to refer to the maximum size or the minimum size in the three-dimensional space of the particle.

The "particle size" is measured by the following method. First, an image of a scattering film (inside of the scattering film) is captured by use of a microscope in a dark viewing field in a direction normal to the surface (the light receiving surface or the light output surface) of the scattering film. Then, the captured image is stored on a personal computer (hereinafter, referred to as a "PC"). At this point, an actual scale is also stored in the captured image. Next, outer contours of the particles in the captured image are traced by use of software installed on the PC (e.g., POWERPOINT (registered trademark) of Microsoft Corporation). In the case where the traced regions of the particles overlap each other, the positions of the regions of the particles are shifted. As a result, an object with the overlapping solved is obtained. Next, an electronic file including the above-mentioned object is read into image analysis software (e.g., ImageJ published by the National Institutes of Health, U.S.A.). As a result, the maximum size, the minimum size and the like of the object are output.

According to the present disclosure, it is preferred that the light scattering particles are light-transmissive. The size of the light scattering particles may be uniform or non-uniform, as long as the plane of polarization of the light transmitted through the light scattering film is not changed almost at all. In terms of the shape, the light scattering particles may be, for example, spherical, elliptic spherical, flat plate-like, polyhedron-shaped or the like. It is most preferred that the light scattering particles are spherical.

The shape and the average particle size of the light scattering particles may be appropriately changed by controlling the stirring speed and the stirring time of a mixture containing the light scattering particles, the organic polymer compound and a solvent. In order to provide, for example, spherical particles, it is necessary to separate individual particles from each other successfully without destroying the aggregated particles. This purpose may be achieved by dispersing the particles mildly by use of a bead mill, with the kinetic energy of the beads being suppressed. The particles may be dispersed mildly by, for example, incorporating microscopic beads into the mixture or by stirring the mixture (containing the beads) at a low circumferential speed. It is more preferred to stir the mixture containing the microscopic beads at a low circumferential speed. It is more preferred to incorporate a dispersant when necessary in order to disperse solid particles into a binder solution homogeneously.

In one embodiment, a light scattering film is formed by the following steps (i) through (iv).

(i) Incorporating light scattering particles and an organic polymer compound into a solvent;

(ii) Stirring the resultant mixture to disperse the light scattering particles mildly, thereby preparing a homogeneous dispersion;

(iii) Applying the resultant dispersion to a substrate to expand the dispersion to the entirety of a surface of the substrate; and (iv) Putting the post-application substrate into a thermostatic chamber (e.g., at 60° C. for 20 minutes).

With such a procedure, a light scatting film including a particle layer that includes spherical light scatting particles may be provided in a dry state on the substrate. For dispersing the light scattering particles, a small amount of dispersant may be incorporated into the dispersion.

In order to form the above-described particle layer (precipitation layer) successfully, it is necessary to precipitate the light scattering particles by the time when the drying of the light scattering film is finished. For this purpose, particles and a solvent with which the precipitation may be finished rapidly are appropriately selected based on the specific gravities (densities) thereof. It is preferred that an inorganic filler suppressing the precipitation (e.g., silica) is not contained in the dispersion.

The light scattering film may be dried at room temperature. In the case where the light scattering film is dried in an environment having a temperature higher than room temperature, it is preferred that the drying temperature is set to be lower than the melting point of the material of the substrate (e.g., polymer film) in order to avoid deformation of the substrate.

According to the present disclosure, a solvent having a boiling point lower than the melting point of the material of the substrate is preferably usable in order to allow the light scattering film to be dried in the above-described temperature range. In the case where PMMA is used for the substrate, solvents having a boiling point lower than the melting point of PMMA are known in the art. In the case where, for example, PMMA and an aqueous solvent are used respectively for the substrate and the solvent, the drying temperature is preferably lower than 100° C., more preferably room temperature to 80° C., and still more preferably room temperature to 60° C.

According to the present disclosure, a light scattering film including such a particle layer is used to suppress the decrease in the normal luminance and also to decrease the optical feedback. Such effects are not derived merely from the point of view of forescatter and backscatter.

As described above, the particle layer may be formed close to the light receiving surface 3a of the light scattering film 3, close to the light output surface 3b of the light scattering film 3, or far from both of the light receiving surface 3a and the light output surface 3b. The particle layer may be formed at a desired position in the light scattering film 3 as follows. The light scattering film including the concentrated particle layer is formed on the substrate so as to be as thin as possible, then is removed from the substrate, and is stacked on a polymer layer formed separately (e.g., a layer formed of an organic polymer compound to be included in the light scattering film). Alternatively, the light scattering film removed from the substrate may be attached to another member (e.g., a polarizing film bonded to a liquid crystal panel). Still alternatively, the light scattering film may be directly formed on the polarizing film.

The substrate used to form the light scattering film may be selected as follows. In the case where the substrate is used in the liquid crystal display apparatus as a part of the light scattering film, the substrate may be a light-transmissive polymer film. In the case where the light scattering film removed from the substrate is used in the liquid crystal display apparatus, the substrate may be a glass substrate, a metal plate or the like.

In the case where a polymer film is used as the substrate, a removing layer may be provided between the light scattering film and the substrate in order to remove the light scattering film from the substrate. A technique for separating the light scattering film from the substrate is not limited to this. In the case where a glass substrate is used as the substrate, it is preferred to use laser lift-off to remove the light scattering film from the substrate. The method for removing the light scattering film is not limited to this. Especially in the case where the light scattering film may be removed immediately after being formed on the substrate (without any other step), the force of adhesion between the light scatting film and the substrate does not need to be strong. In the case where the force of adhesion between the light scatting film and the substrate is not strong, a knife edge or the like may be used to mechanically remove the light scatting film. Such a mechanical removal procedure is usable regardless of whether the substrate is formed of glass, a metal material or a polymer film. The force of adhesion between the light scattering film and the substrate may be adjusted by, for example, adjusting the conditions under which the light scattering film is formed or by surface-treating the substrate (e.g., treating the surface of the substrate to be water-repellent).

The liquid crystal display apparatus according to the present disclosure has the above-described structure, and therefore, provides wide viewing angles (color viewing angle and luminance viewing angle). In this specification, the color viewing angle and the luminance viewing angle are defined as follows.

The color viewing angle is a difference (amount of color shift) between the color of the display viewed at a polar angle of 0° with respect to the display device (normal-direction view) and the color of the display viewed in a direction inclined with respect to the display device (polar angle θ≠0°) (oblique-direction view), and is evaluated as a color difference Δu'v'. Specifically, the color viewing angle may be evaluated as the color difference Δu'v' calculated from measurement values obtained by use of a 2D Fourier transform optical goniometer (Ezcontrast produced by ELDIM) under the conditions where no light is incident other than light from a measurement portion. According to the present disclosure, it is preferred that the color viewing angle satisfies the value (Δu'v'=0.020) obtained with reference to the document (S. Ochi, et al., "Development of Wide Viewing VA-LCD System by Utilizing Microstructure Film" IDW16, 472-475 (2016)). The polar angle thereof is ±32.5°. The color difference Δu'v' is defined by the following expression.

$$\Delta u'v' = \sqrt{(u' \text{ normal} - \text{viewing angle as viewed from } u')^2 + (v' \text{ normal} - \text{viewing angle as viewed from } v')^2} \qquad \text{[Expression 1]}$$

The luminance viewing angle is evaluated as the difference between the luminance of the display viewed at a polar angle of 0° with respect to the display device (normal-direction view) and the luminance of the display viewed in a direction inclined with respect to the display device (polar angle θ≠0°) (oblique-direction view). Specifically, the luminance viewing angle may be evaluated by measuring the angle (polar angle), of the oblique-direction view, at which a luminance that is ⅓ of the luminance measured in the normal-direction view (0°) is obtained by use of the 2D Fourier transform optical goniometer (Ezcontrast produced by ELDIM) under the conditions where no light is incident other than light from a measurement portion. According to the present disclosure, it is preferred that the luminance viewing angle is the value obtained with reference to the above-mentioned document (the above-mentioned angle exhibiting ⅓ of the luminance is ±42.5° or larger).

In the case where a condensing light source is used as the backlight unit 1, almost no light output from the backlight unit 1 crosses the liquid crystal composition contained in the liquid crystal panel 2 obliquely. Therefore, the liquid crystal composition does not transmit the light at all. As a result, complete black is displayed in the normal-direction view.

Use of a light-condensing backlight unit narrows the viewing angle. However, the liquid crystal display apparatus according to the present disclosure includes the light scattering film 3, and therefore, may provide a wide viewing angle despite using a light-condensing backlight unit.

As shown in FIG. 1A, the light scattering film 3 is located such that the rear surface (light receiving surface) 3a thereof faces the liquid crystal panel. Alumina particles having a volume of $9.0 \times 10^{-7}$ m$^3$ is dispersed as the light scattering particles 31 per 1 m$^2$-plane of the particle layer 30, which is parallel to the light receiving surface 3a of the light scattering film 3. A VA-system liquid crystal display apparatus including the light scattering film 3 having such a structure was produced, and black luminance was measured while the polar angle was changed from −90° to 90° when the azimuth was 0° or 45° based on the rightward direction of the liquid crystal panel as seen from a viewer present in the direction normal to the liquid crystal panel. The black luminance was constant when the azimuth was 0° and also when the azimuth was 45°.

Also in a liquid crystal display apparatus without the light scattering film 3, the black luminance was measured in substantially the same manner. The black luminance was significantly changed when the azimuth was 45°.

Even in the case of color display, almost no light crosses the liquid crystal composition contained in the liquid crystal panel 2 obliquely. Therefore, the color change is suppressed.

As can be seen, use of the light-condensing backlight unit 1 and the light scattering film 3 in combination may decrease the change in the black luminance and the color change. Namely, any backlight unit is usable that condenses the light transmitted through the liquid crystal composition contained in the liquid crystal panel 2 to such a degree that neither the black luminance nor the color is changed. The present inventors have confirmed that the influence of light crossing the liquid crystal composition contained in the liquid crystal panel 2 obliquely is eliminated as long as the polar angle is in the range of −32° to +32°.

The liquid crystal display apparatus 10 according to this embodiment includes another polarizing plate (third polarizer 4) provided to the front of (closer to the viewer than) the second polarizer 23. The light scattering film 3 is provided between the second polarizer 23 and the third polarizer 4. Namely, the liquid crystal display apparatus 10 according to this embodiment further includes the third polarizer 4, and is structured such that the light from the backlight unit 1 is transmitted through the third polarizer 4 after being transmitted through the liquid crystal panel 2 and the light scattering film 3. According to the present disclosure, the first through third polarizers are all linear polarizers. The light scattering film 3 is a layer that scatters light isotropically. No layer that scatters light anisotropically is provided between the second polarizer 23 and the third polarizer 4.

The third polarizer 4 receives light output from the light output surface 3b of the light scattering film 3, and outputs the light toward the viewer present to the front of the liquid crystal display apparatus 10.

The present inventors, after accumulating studies based on the inventors' original point of view, have found out that the polarization characteristic (direction of the axis of polarization) of the light from the backlight unit 1 is not changed almost at all during the transmission of the light through the light scattering film 3, namely, that the characteristic of the linearly polarized light before the light is transmitted through the light scattering film 3 is generally maintained even after the light is transmitted through the light scattering film 3. In other words, in the liquid crystal display apparatus 10 according to the present disclosure, the linearly polarized light that has been transmitted through the liquid crystal panel 2 maintains the vibration direction thereof even after being transmitted through the light scattering film 3. As a result, even in the case where a polarizing plate having a transmission axis extending in the direction substantially the same as the transmission axis of the second polarizer 23 is located at a position in the direction normal to the light scattering film 3, the light transmitted through the liquid crystal panel 2 may be output from the third polarizer without being attenuated almost at all.

A polarizing film including a dye (dichroic dye) that appears to be of one color in one direction and appears to be of a different color in a direction perpendicular thereto when being oriented in a medium is known (see, for example, Japanese Laid-Open Patent Publication No. 2011-43685). Dichroic dyes include organic dyes and inorganic dyes (so-called iodine-based dyes).

A dichroic dye is a compound that exhibits a polarizing property when being oriented in a certain direction independently or in an assembly with another compound. Examples of such a dichroic dye include dye-based compounds such as an azo-based dye, a stilbene-based dye, a pyrazolone-based dye, a triphenylmethane-based dye, a quinoline-based dye, an oxazine-based dye, a thiazine-based dye, an anthraquinone-based dye, and the like. For the third polarizer, one type of dichroic dye may be used independently, or two or more types of dichroic dyes may be used in combination.

In one embodiment, the third polarizer includes a resin sheet provided as a substrate and a dye layer formed of a dichroic dye provided on a surface of the resin sheet. In this embodiment, the third polarizer is formed by causing a dye composition containing a dichroic dye to adsorb to, and to be oriented in, the resin sheet. For example, the resin sheet is stretched and dyed with the dye composition. The resin sheet may be stretched before being immersed, while being immersed, or after being immersed, in the dye composition. Alternatively, these methods of immersion may be combined. The stretching is usually performed with monoaxial stretching. There is no specific limitation on the method for the monoaxial stretching. Wet stretching or dry stretching may be used. The resin sheet having the dye adsorbing thereto and oriented therein is treated with boric acid, rinsed with water and dried. As a result, a desired third polarizer (polarizing film) is provided.

In one embodiment, the third polarizer is a resin sheet containing a dichroic dye. In this case, the resin sheet containing a dichroic dye is the dye layer. In this embodiment, the third polarizer is formed by impregnating a swollen resin sheet with a dye composition and then stretching the resin sheet.

In the swelling step, the resin sheet is immersed in water of 10 to 50° C. to be swollen. It is preferred that the water has a temperature of 20° C. or higher and 40° C. or lower. The resin sheet is immersed in a solution of such a temperature range, and as a result, the resin sheet may be swollen homogeneously at high efficiency. In the dyeing step performed after the swelling step, for example, the resin sheet is immersed in a solution containing a dichroic dye and having a temperature of 10 to 50° C. to be impregnated with the dichroic dye, and is also stretched monoaxially to be stretched at a total stretching magnification of twice to three times. As a result, the resin sheet is impregnated with the dichroic dye, and molecular chains of the dichroic dye in the sheet are oriented. The resin sheet having the oriented dye is rinsed with water and dried, and as a result, a desired polarizing film is provided.

The dye layer of the third polarizer 4 containing the dichroic dye is bonded to the light output surface 3b of the light scattering film 3. In this case, it is preferred that the light scattering film 3 is formed of the functional layer 30 (FIG. 1A). Namely, it is preferred that the light scattering film formed of the functional layer is directly bonded to the dye layer of the third linear polarizer. With such a structure, a substrate of PET or the like is not present between the second polarizer 23 and the dye layer of the third polarizer 4. Therefore, the possibility that a multi-layer film including the light scattering film 3 and the third polarizer 4 bonded to each other is warped is significantly decreased. Such an effect of decreasing the warp is not described or suggested in any of the above-mentioned documents.

Even in the case where the light scattering film 3 includes the substrate 33 (e.g., FIG. 1B), the amount of the substrate present between the second polarizer 23 and the third polarizer 4 may be decreased as long as the substrate 33 is combined with the third polarizer 4 containing the dichroic dye. Therefore, the warp of the multi-layer film, which may be caused by the property of the substrate of absorbing moisture, may be decreased. Therefore, there is no specific limitation on the type of the resin to be used for the resin sheet. The resin sheet may be formed of, for example, TAC or PET.

In order to provide a polarizer having a high polarization characteristic, the above-described dye layer has a thickness that is preferably, for example, 0.001 to 10 μm, and more preferably 0.05 to 2 μm. In order to provide such a dye layer, the above-described dye composition is applied in a thickness that is preferably, for example, 2 to 10 μm, and more preferably 3 to 5 μm. The dye composition may be applied in substantially the same procedure as that for the light scattering film.

As the solvent contained in the dye composition, any composition capable of dissolving a dichroic dye is usable with no specific limitation. Examples of the usable solvent include water and various organic solvents (e.g., alcohols, ethers, pyridine, dimethylformamide (DMF), dimethylsulfoxide (DMSO), N-methylpyrrolidinone (NMP), dimethylacetamide (DMAC), dimethylimidazoline (DMI), etc.). The dye composition may contain only one of, or a plurality of, these solvents. Especially in the case where a water-soluble dichroic dye is used, it is preferred to use water or a mixed solvent of water and any of the above-listed organic solvents.

In one embodiment, an organic polymer compound contained in the resin sheet is different from the organic polymer compound contained in the light scattering film (functional layer).

The third polarizer may be formed of a stacked body including a substrate and a dye layer or a stacked body further including a protective film or the like stacked on a surface of the dye layer. The protective film may be, for example, a polyester-based film, a cellulose acetate-based film, an acrylic film, a cyclic polyolefin film having a norbornene structure, a polycarbonate-based film, a polyarylate-based film, a polyethersulfone-based film, or the like.

The use of a polarizer described above may prevent, at high efficiency, the display quality from being declined due to the optical feedback.

In the liquid crystal display apparatus 10 according to this embodiment, the third polarizer 4 having the transmission axis extending in generally the same direction as the transmission axis of the second polarizer 23 is structured to cover the light receiving surface 3a of the light scattering film 3. The liquid crystal display apparatus 10 does not include a component that scatters light anisotropically (e.g., prism) between the second polarizer 23 and the third polarizer 4.

With such a structure, the liquid crystal display apparatus 10 according to this embodiment halves the external light from a position to the front thereof and therefore, halves the optical feedback. Such a structure does not decrease the luminance of the display viewed at a polar angle of 0° with respect to the liquid crystal display apparatus 10 (hereinafter, such a luminance will be referred to also as a "normal luminance").

As a technology for suppressing the decrease in the visual recognizability caused by the reflection of the external light from the viewer's side, it is known to provide another polarizing plate to the front of the front polarizing plate and locate two ¼-wave plates between the two polarizing plates to form a circular polarizing plate (e.g., Japanese Laid-Open Patent Publication No. Hei 5-281538).

By contrast, the liquid crystal display apparatus 10 according to this embodiment decreases the optical feedback (including the reflected external light) with no use of a circular polarizer. No structure is known in the art at all that decreases the optical feedback at the light scattering film while maintaining the characteristics of the linearly polarized light without generating circularly polarized light.

It is also known to provide a diffusing layer between a color filter and a front polarizing plate in order to decrease the amount of external light reflected by the color filter or to improve the contrast ratio (e.g., Japanese Laid-Open Patent Publication No. 2006-208647). This document merely discloses a structure using one polarizing plate on the viewer's side with respect to the panel. The technology described in this document utilizes that the plane of polarization of the transmitted light is changed by the transmitted light being transmitted through the provided diffusing layer.

By contrast, the liquid crystal display apparatus 10 according to this embodiment includes two polarizing plates on the viewer's side with respect to the liquid crystal panel 2, and uses a light scattering film that does not change the plane of polarization of the transmitted light. The use of such a structure in order to decrease the optical feedback at the light scattering film is not known in the art at all.

In order to decrease blur of the display caused by a light diffuser located on the viewer's side with respect to the liquid crystal panel, it is also known to provide, as such a light diffuser, a component that scatters light anisotropically such as a prism or the like (e.g., Japanese Laid-Open Patent Publication No. 2007-71916). The technology disclosed by this document indispensably requires a light diffuser having three-dimensional anisotropy as a light diffusion characteristic.

By contrast, the liquid crystal display apparatus does not include a component that scatters light anisotropically on the viewer's side with respect to the liquid crystal panel. Needless to say, the light scattering film 3 according to this embodiment does not include an anisotropic light scattering layer. Such a structure is not described or suggested in any of the above-described documents.

The direction of the transmission axis of the third polarizer 4 generally matches the direction of the transmission axis of the second polarizer 23. Therefore, the amount of the detected light is not changed almost at all regardless of whether the third polarizer 4 is present or absent. This may be confirmed by locating a light amount detection camera on the viewer's side with respect to the liquid crystal display apparatus 10 and detecting the amount (luminance) of light transmitted through the liquid crystal panel 2 and the light scattering film 3 (and the third polarizer 4) by the light amount detection camera.

A third polarizer 4 may be appropriately selected in accordance with the second polarizer 23. In the case where the direction of the transmission axis of the second polarizer 23 is not clearly known, a linear polarizer located instead of the third polarizer 4 may be rotated when necessary. In this manner, the third polarizer 4 to be used may be determined based on the position at which the amount of light detected by the light amount detection camera is maximum.

In the liquid crystal display apparatus 10 according to this embodiment, the light scattering film 3 is located between the liquid crystal panel 2 and the third polarizer 4, and includes the light scattering particles 31 scattering light and the organic polymer compound 32 containing the light scattering particles 31. After being transmitted through the liquid crystal panel 2, the light output from the backlight unit 1 is input to the inside of the light scattering film 3 from the light receiving surface 3a. The angular distribution of the light is made broader than the angular distribution of the light transmitted through the liquid crystal panel 2. Then, the light is output to the outside of the light scattering film 3 from the light output surface 3b.

The third polarizer 4 is located so as to face the light output surface 3b of the light scattering film 3. The third polarizer 4 transmits light having an axis of polarization extending in the same direction as that of the light transmitted through the second polarizer 23. In other words, the second polarizer 23 and the third polarizer 4 have the transmission axes extending in the same direction. The light transmitted through the second polarizer 23 is transmitted through the light scattering film 3 and then is transmitted through the third polarizer 4 without decreasing the intensity thereof almost at all.

By contrast, in the case where external light is incident on the third polarizer 4, the light is converted by the third polarizer 4 into linearly polarized light passing the transmission axis of the third polarizer 4. Half of the incident external light is absorbed by the third polarizer 4. Therefore, half of the external light from the viewer's side is transmitted through the third polarizer 4, and the optical feedback thereof is directed toward the viewer's side.

For example, a liquid organic polymer compound containing alumina powder (precursor of an acrylic resin) 32 is applied to have a thickness of 30 μm and dried, so that the functional layer 30 having, after being dried, a thickness of 6 μm and a particle concentration of 15 to 18% by volume is formed. In the liquid crystal display apparatus 10 according to one embodiment, the functional layer 30 having such a structure is directly bonded to the second polarizer 23 of the liquid crystal panel 2, and the third polarizer 4 is provided on the light output surface 3b of the light scattering film 3. The liquid crystal display apparatus 10 having such a structure significantly suppresses the optical feedback, and as a result, provides a very high normal contrast in a bright site. This liquid crystal display apparatus has a wide viewing angle.

According to the present disclosure, a light scattering film including such a particle layer is used to suppress the decrease in the normal luminance and also to decrease the optical feedback. In addition, the use of the light scattering film having such a structure allows the third polarizer 4 having a transmission axis extending in generally the same direction as the transmission axis of the second polarizer 23 to be located to the front of the light output surface 3b of the light scattering film 3. Thus, the optical feedback is suppressed with almost no decrease in the normal luminance. Such effects are not derived merely from the point of view of forescatter and backscatter.

SUMMARY (1) A liquid crystal display apparatus according to one embodiment of the present disclosure includes a light-condensing backlight unit; a liquid crystal panel including a first linear polarizer on which light from the backlight unit is incident and a second linear polarizer from which the light is output; a light scattering film facing the second linear polarizer; and a third linear polarizer facing the light scattering film. The light scattering film includes a functional layer including an organic polymer compound and light scattering particles contained in the organic polymer compound. The third linear polarizer has an axis of polarization extending in the same direction as an axis of polarization of the second linear polarizer.

According to one embodiment of the present disclosure, the light scattering film is provided so as to face the second linear polarizer of the liquid crystal panel. Therefore, a wide viewing angle may be provided. In addition, the light-condensing backlight unit is used. Therefore, almost no light crosses the liquid crystal composition contained in the liquid crystal panel obliquely. As a result, neither the black luminance nor the color is changed almost at all between in the normal-direction view and in the oblique-direction view. Moreover, as the third linear polarizer that transmits light transmitted through the light scattering film, a polarizer having an axis of polarization extending in the same direction as the axis of polarization of the second linear polarizer is provided. Therefore, the light from the liquid crystal panel may be output forward without being attenuated by the third linear polarizer. Even in the case where external light from a position to the front of the liquid crystal panel is incident on the liquid crystal panel via the third linear polarizer, this external light is attenuated to half by the third linear polarizer. Therefore, the decrease in the normal contrast ratio in a bright site caused by the optical feedback may be suppressed.

(2) In the above-described liquid crystal display apparatus, it is preferred that the light scattering particles have an average particle size of 1.5 μm or larger and 6.0 μm or smaller.

(3) In the above-described liquid crystal display apparatus, it is preferred that the light scattering film has a thickness of 4 μm or greater and 220 μm or less for the following reason. If the light scattering film is too thin, the light may not be diffused sufficiently. If the light scattering film is too thick, the transmitted light may possibly be attenuated.

(4) In the above-described liquid crystal display apparatus, it is preferred that a fraction of the light scattering particles that have a particle size of 1.5 μm or larger and 4.5 μm or smaller has a content of 60% by volume or higher and 96% by volume or lower with respect to the entirety of the light scattering particles included in the functional layer.

(5) In the above-described liquid crystal display apparatus, it is preferred that a fraction of the light scattering particles that has a particle size of 0.1 μm or larger and smaller than 1.5 μm has a content of 4% by volume or higher and 40% by volume or lower with respect to the entirety of the light scattering particles included in the functional layer.

(6) In the above-described liquid crystal display apparatus, it is preferred that the light scattering particles included in the functional layer corresponding to 1 $cm^2$ of a contact surface, of the light scattering film, that is in contact with the second linear polarizer has a total volume of 0.5 $cm^3$ or larger and 10.0 $cm^3$ or smaller.

(7) In the above-described liquid crystal display apparatus, it is preferred that a refractive index of the light scattering particles and a refractive index of the organic polymer compound have a difference of 0.15 or larger and 1.0 or smaller.

(8) In the above-described liquid crystal display apparatus, it is preferred that the functional layer includes a particle layer in which a fraction of 60% by volume to 100% by volume of the light scattering particles included in the functional layer expands along a surface of the particle layer at which the light output from the liquid crystal panel is received, and that the particle layer is concentrated to a region having a thickness of 1 to 80% of a total thickness of the functional layer, in a direction perpendicular to the contact surface.

(9) In the above-described liquid crystal display apparatus, it is preferred that the organic polymer compound is at least one selected from the group consisting of polymethylmethacrylate, polyvinylalcohol, polyvinylchloride, polycarbonate, polyethylene, polystyrene, polyamide, silicone, urea, epoxy, polypropylene, cellulose acetate, and polyvinylidenechloride, and that the light scattering particles are formed of at least one material selected from the group consisting of alumina, melamine resin and hollow silica.

(10) In the above-described liquid crystal display apparatus, it is preferred that the backlight unit is structured such that among light incident on the first linear polarizer, light having a normalized luminance of 0.5 or higher is incident thereon at an angle of incidence of 32° or smaller. The light output from such a backlight unit does not cross the liquid crystal composition obliquely almost at all, and therefore, does not change the black luminance or the color.

REFERENCE SIGNS LIST 1 backlight unit
2 liquid crystal panel
21 first polarizer
22 liquid crystal layer
21a liquid crystal composition
23 second polarizer
3 light scattering film
30 functional layer
31 light scattering particles
32 organic polymer compound
4 third polarizer

The invention claimed is:
1. A liquid crystal display apparatus, comprising:
a light-condensing backlight unit;
a liquid crystal panel including a first linear polarizer on which light from the backlight unit is incident and a second linear polarizer from which the light is output;
a light scattering film facing the second linear polarizer; and
a third linear polarizer facing the light scattering film,
wherein the light scattering film includes a functional layer including an organic polymer compound and light scattering particles contained in the organic polymer compound,
wherein the third linear polarizer has an axis of polarization extending in the same direction as an axis of polarization of the second linear polarizer,
wherein the functional layer includes a particle layer in which a fraction of 60% by volume to 100% by volume of the light scattering particles included in the functional layer expands along a surface of the particle layer at which the light output from the liquid crystal panel is received, and
wherein the particle layer is concentrated to a region having a thickness of 1 to 80% of a total thickness of the functional layer.

2. The liquid crystal display apparatus of claim 1, wherein the light scattering particles have an average particle size of 1.5 μm or larger and 6.0 μm or smaller.

3. The liquid crystal display apparatus of claim 1, wherein the light scattering film has a thickness of 4 μm or greater and 220 μm or less.

4. The liquid crystal display apparatus of claim 3, wherein a fraction of the light scattering particles that have a particle size of 1.5 μm or larger and 4.5 μm or smaller has a content of 60% by volume or higher and 96% by volume or lower with respect to the entirety of the light scattering particles included in the functional layer.

5. The liquid crystal display apparatus of claim 4, wherein a fraction of the light scattering particles that have a particle size of 0.1 μm or larger and smaller than 1.5 μm has a content of 4% by volume or higher and 40% by volume or lower with respect to the entirety of the light scattering particles included in the functional layer.

6. The liquid crystal display apparatus of claim 1, wherein the light scattering particles included in the functional layer corresponding to 1 cm$^2$ of a contact surface, of the light scattering film, that is in contact with the second linear polarizer has a total volume of 0.5 cm$^3$ or larger and 10.0 cm$^3$ or smaller.

7. The liquid crystal display apparatus of claim 1, wherein a refractive index of the light scattering particles and a refractive index of the organic polymer compound have a difference of 0.15 or larger and 1.0 or smaller.

8. The liquid crystal display apparatus of claim 1,
wherein the particle layer is not in contact with a light output surface of the light scattering film.

9. The liquid crystal display apparatus of claim 1,
wherein the organic polymer compound is at least one selected from the group consisting of polymethylmethacrylate, polyvinylalcohol, polyvinylchloride, polycarbonate, polyethylene, polystyrene, polyamide, silicone, urea, epoxy, polypropylene, cellulose acetate, and polyvinylidenechloride, and
wherein the light scattering particles are formed of at least one material selected from the group consisting of alumina, melamine resin and hollow silica.

10. The liquid crystal display apparatus of claim 1, wherein the backlight unit is structured such that among light incident on the first linear polarizer, light having a normalized luminance of 0.5 or higher is incident thereon at an angle of incidence of 32° or smaller.

11. The liquid crystal display apparatus of claim 1, wherein no component that scatters light anisotropically is provided between the second linear polarizer and the third linear polarizer.

12. The liquid crystal display apparatus of claim 11, wherein the light scattering film is formed of the functional layer scattering light isotropically.

13. The liquid crystal display apparatus of claim 1, wherein the third linear polarizer includes a dye layer containing a dichroic dye in an oriented state.

14. The liquid crystal display apparatus of claim 12,
wherein the third linear polarizer includes a dye layer containing a dichroic dye in an oriented state, and wherein the functional layer is directly bonded to the dye layer.

* * * * *

UNITED STATES PATENT AND TRADEMARK OFFICE
CERTIFICATE OF CORRECTION

| | |
|---|---|
| PATENT NO. | : 11,698,548 B2 |
| APPLICATION NO. | : 17/599489 |
| DATED | : July 11, 2023 |
| INVENTOR(S) | : Yukio Yoshida et al. |

It is certified that error appears in the above-identified patent and that said Letters Patent is hereby corrected as shown below:

On the Title Page

Item (30) Foreign Application Priority Data should read:
Mar. 28, 2019 (JP)............ PCT/JP2019/013818

Signed and Sealed this
Thirteenth Day of February, 2024

Katherine Kelly Vidal
*Director of the United States Patent and Trademark Office*